(12) United States Patent
Hirano et al.

(10) Patent No.: US 9,334,368 B2
(45) Date of Patent: May 10, 2016

(54) POLYIMIDE PRECURSOR SOLUTION COMPOSITION

(75) Inventors: Tetsuji Hirano, Chiba (JP); Toru Kidosaki, Chiba (JP)

(73) Assignee: UBE INDUSTRIES, LTD., Yamaguchi (JP)

( * ) Notice: Subject to any disclaimer, the term of this patent is extended or adjusted under 35 U.S.C. 154(b) by 1348 days.

(21) Appl. No.: 13/125,451

(22) PCT Filed: Oct. 28, 2009

(86) PCT No.: PCT/JP2009/068463
§ 371 (c)(1),
(2), (4) Date: Apr. 21, 2011

(87) PCT Pub. No.: WO2010/050491
PCT Pub. Date: May 6, 2010

(65) Prior Publication Data
US 2011/0193016 A1   Aug. 11, 2011

(30) Foreign Application Priority Data

Oct. 31, 2008 (JP) .................... 2008-281977
Oct. 31, 2008 (JP) .................... 2008-281978
Mar. 31, 2009 (JP) .................... 2009-085276

(51) Int. Cl.
| | | |
|---|---|---|
| C08G 73/10 | (2006.01) | |
| C08L 79/08 | (2006.01) | |
| C09D 179/08 | (2006.01) | |
| H01M 4/62 | (2006.01) | |
| H01M 4/133 | (2010.01) | |
| H01M 4/134 | (2010.01) | |
| C08K 5/092 | (2006.01) | |
| C08K 5/1539 | (2006.01) | |

(52) U.S. Cl.
CPC .......... *C08G 73/1042* (2013.01); *C08G 73/105* (2013.01); *C08G 73/1046* (2013.01); *C08G 73/1067* (2013.01); *C08G 73/1071* (2013.01); *C08L 79/08* (2013.01); *C09D 179/08* (2013.01); *H01M 4/621* (2013.01); *H01M 4/622* (2013.01); *C08K 5/092* (2013.01); *C08K 5/1539* (2013.01); *H01M 4/133* (2013.01); *H01M 4/134* (2013.01)

(58) Field of Classification Search
CPC ........... C08G 73/1042; C08G 73/1067; C09D 179/04; C08L 79/08
USPC ......................................................... 525/436
See application file for complete search history.

(56) References Cited

U.S. PATENT DOCUMENTS

| 4,923,968 A | 5/1990 | Kunimune et al. |
|---|---|---|
| 6,265,107 B1 | 7/2001 | Shimizu et al. |
| 2001/0009936 A1* | 7/2001 | Suzuki et al. .................... 524/35 |
| 2010/0130628 A1 | 5/2010 | Yamaguchi et al. |

FOREIGN PATENT DOCUMENTS

| JP | 50-063019 | 5/1975 |
|---|---|---|
| JP | 60-063226 | 4/1985 |
| JP | 61-143433 | 7/1986 |
| JP | 63-172735 | 7/1988 |
| JP | 10-233217 | 9/1998 |
| JP | 2003-041189 | 2/2003 |
| WO | WO 2008/120787 | 10/2008 |

OTHER PUBLICATIONS

Takashi et al., English machine translation of JP2003-041189A (2003).*
Shim J.H. et al., Materials Science Monographs (1984), 21, pp. 61-68.
International Search Report, PCT/JP2009/068463, Dec. 22, 2009.
Chinese Official Action—200980141753.1—Sep. 18, 2012.

* cited by examiner

*Primary Examiner* — Peter F Godenschwager
(74) *Attorney, Agent, or Firm* — Young & Thompson

(57) ABSTRACT

A first polyimide precursor solution composition contains: (A) a polyamic acid; (B) a carboxylic acid compound having at least three pairs of carboxyl groups within its molecule or an esterified product thereof; and (D) a solvent. A second polyimide precursor solution composition contains the components (A), (B), and (D) of the first polyimide precursor solution composition and additionally containing (C) a carboxylic acid compound having two pairs of carboxyl groups within its molecule or an esterified product thereof. A third polyimide precursor solution composition contains the components of the second polyimide precursor solution composition, wherein the polyamic acid (A) is a polyamic acid having a specific structure.

8 Claims, No Drawings

POLYIMIDE PRECURSOR SOLUTION COMPOSITION

TECHNICAL FIELD

The present invention relates to a polyimide precursor solution composition containing a polyamic acid as a main component. The polyimide precursor solution composition of the invention can easily be adjusted in terms of solution viscosity, has a stable solution viscosity, and can suitably produce polyimide-resin-formed products, such as polyimide films, having properties equal to or superior to those of straight-chain polyimides through heating at relatively low temperatures and/or in a short time.

The present invention also relates to a polyimide precursor solution composition that can produce a polyimide resin having excellent toughness, and to the polyimide resin produced therefrom. The polyimide resin produced from the polyimide precursor solution composition of the invention can suitably be used as formed products, such as endless belts, insulating protective films and other films, and as a binder resin for electrodes of electrochemical elements.

BACKGROUND ART

Polyimides are being widely developed because of their good heat resistance and mechanical properties. In particular, wholly aromatic polyimides can achieve especially high heat resistance and excellent mechanical properties due to their stiff structures. Recent trends call for wholly aromatic polyimides particularly having excellent toughness that can endure use in severer conditions.

Aromatic polyimides are generally insoluble and infusible. Therefore, their precursors, i.e., polyamic acid solution compositions, are often used for molding and processing. The polyamic acid can be imidized in various ways, including: (a) thermal imidization; (b) chemical imidization using a dehydrator; and (c) a combination of thermal and chemical imidization. Among these, methods (b) and (c) employing chemical imidization can achieve imidization at relatively low temperatures, but the solution is prone to gelate, thus posing difficulty in producing polyimide-resin-formed products with satisfactory quality. Meanwhile, thermal imidization employed in method (a) involves solvent removal and is thus less prone to cause gelation. It, however, requires heating at elevated temperatures for a prolonged period of time—e.g., raising the temperature stepwise up to the maximum heating temperature while imparting high physical properties during the heating step—in order to produce polyimide-resin-formed products, such as polyimide films, with excellent properties.

Patent Document 1 discloses an aromatic polyimide using 3,3',4,4'-biphenyltetracarboxylic acid as the tetracarboxylic acid component and 4,4'-oxydianiline and 1,3-bis(4-aminophenoxy)benzene as the diamine components constituting the polyamic acid. Patent Document 2 discloses a fusible-and-moldable crystalline polyimide resin. These Patent Documents, however, fail to disclose mechanical properties thereof.

Patent Document 3 discloses a method of improving the properties of polyimide-formed products obtained after viscosity adjustment and thermal imidization of a polyamic acid solution, the method including: adding an aromatic tetracarboxylic acid or an anhydride thereof to a polyamic acid solution prepared using an excessive amount of an aromatic diamine with respect to an aromatic tetracarboxylic dianhydride, such that the acid component and the diamine component become equimolar. However, the properties, such as the mechanical properties, of the polyimide-formed products obtained according to this method are not necessarily sufficient, and there still is room for improvement to suitably produce polyimide-resin-formed products, such as polyimide films, having properties equal to or superior to those of straight-chain polyimides through heating at relatively low temperatures and/or in a short time.

Patent Document 4 discloses a varnish containing a polyamic acid having an amino group at its molecular end and, as a cross-linking component, a polyfunctional carboxylic acid compound represented by the following chemical formula capable of forming three or four imide rings through reaction with the amino group.

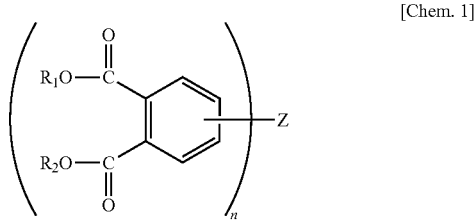

[Chem. 1]

(In the formula, n represents 3 or 4; Z represents a trivalent or tetravalent aromatic group; and $R_1$ and $R_2$ each independently represent a monovalent group selected from hydrogen, an alkyl group, or a phenyl group.)

The varnish of Patent Document 4 may be effective in improving solvent resistance—one of the weak points in so-called thermoplastic polyimides having low glass transition temperatures. However, because of the large number of cross-linking points in the varnish, the resultant cross-linked polyimide tends to become hard and/or brittle, causing problems during use due to deterioration in flexibility, extensibility, and toughness compared to common polyimides. Particularly, with so-called wholly aromatic polyimides having glass transition temperatures of 250° C. or higher and exhibiting excellent heat resistance and mechanical properties due to their stiff structures, there is difficulty in the heating step to suitably control the cross-linking reaction while, at the same time, increasing the molecular weight of the straight-chain polyimide segment to impart high physical properties, thus posing difficulty in suitably producing polyimide-resin-formed products, such as polyimide films, having excellent properties through heating at relatively low temperatures and/or in a short time.

Further, the polyfunctional carboxylic acid compound of Patent Document 4 represented by the above chemical formula has a peculiar structure containing four or more aromatic rings. This compound may be effective in improving solvent resistance—one of the weak points in so-called thermoplastic polyimides having glass transition temperatures of 250° C. or below. However, the segment originating from the polyfunctional carboxylic acid compound will occupy a large volume fraction within the polyimide, thus creating a significant impact on the polyimide properties, such as disturbing the polyimide's crystalline properties, and posing difficulty in making the properties intrinsic to polyimides become evident, especially in highly-heat-resistant polyimide-formed products having glass transition temperatures of 250° C. or higher. Therefore, it is difficult to suitably produce polyimide-resin-formed products, such as polyimide films, having properties equal to or superior to those of straight-chain polyimides through heating at relatively low temperatures and/or in a short time, especially in cases of highly-heat-resistant polyimide-resin-formed products.

Further, the polyfunctional carboxylic acid compound is neither commercially available nor easy to synthesize, thus difficult to obtain and extremely costly.

Non-Patent Document 1 discloses a polyimide using mellitic trianhydride. The Document, however, merely discloses a polyimide consisting of mellitic trianhydride and a diamine, and describes nothing about combining it with a straight-chain polyamic acid.

Patent Document 1: JP-A-61-143433
Patent Document 2: JP-A-63-172735
Patent Document 3: JP-A-60-63226
Patent Document 4: JP-A-2003-41189
Non-Patent Document 1: Shim J. H. et al., Materials Science Monographs (1984), 21, pp. 61-68

SUMMARY OF INVENTION

Technical Problem

An object of the invention is to provide a polyimide precursor solution composition whose solution viscosity can easily be adjusted, that has a stable solution viscosity, and that can suitably produce polyimide-resin-formed products, such as polyimide films, having properties equal to or superior to those of straight-chain polyimides through heating at relatively low temperatures and/or in a short time.

Another object of the invention is to provide a polyimide precursor solution composition that can produce a polyimide resin having high toughness and whose solution viscosity can easily be adjusted, and to provide polyimide-formed products, such as endless belts, insulating protective layers, and films, and binder resins for electrodes of electrochemical elements, which can be produced from the present polyimide precursor solution composition.

Solution to Problem

Inventors have made elaborate investigation and have found that a polyimide precursor solution composition prepared by adding a low molecular-weight mellitic acid compound to a polyamic acid solution can easily be adjusted in terms of solution viscosity, has a stable solution viscosity, and can also produce polyimide-resin-formed products having high physical properties through heating at relatively low temperatures and/or in a short time, and that such a solution composition has no adverse effect on the polyimide's properties, such as glass transition temperature, while being able to suitably produce polyimide-resin-formed products, such as polyimide films, having properties equal to or superior to those of straight-chain polyimides, thus arriving at the present invention.

That is, the present invention provides a polyimide precursor solution composition containing: (A) a polyamic acid; (B) a carboxylic acid compound having at least three pairs of carboxyl groups within its molecule or an esterified product thereof; and (D) a solvent (referred to hereinafter as "first invention").

Inventors have also found, through elaborate investigation, that a polyimide precursor solution composition prepared by adding, to a solution of a polyamic acid (A), (B) a carboxylic acid compound having at least three pairs of carboxyl groups within its molecule or an esterified product thereof and (C) a carboxylic acid compound having two pairs of carboxyl groups within its molecule or an esterified product thereof— both (B) and (C) having low molecular weight—can easily be adjusted in terms of solution viscosity, has a stable solution viscosity, and can also produce polyimide-formed products having high physical properties through heating at relatively low temperatures and/or in a short time, and that such a solution composition has no adverse effect on the polyimide's properties, such as glass transition temperature, while being able to suitably produce, with excellent reproducibility, polyimide-resin-formed products, such as polyimide films, having properties equal to or superior to those of straight-chain polyimides, thus arriving at the present invention.

That is, the present invention also provides a polyimide precursor solution composition containing: (A) a polyamic acid; (B) a carboxylic acid compound having at least three pairs of carboxyl groups within its molecule or an esterified product thereof; (C) a carboxylic acid compound having two pairs of carboxyl groups within its molecule or an esterified product thereof; and (D) a solvent (referred to hereinafter as "second invention").

Inventors have also found that the use of a polyimide precursor solution composition containing (A) a polyamic acid having a specific structure, (B) a carboxylic acid compound having at least three pairs of carboxyl groups within its molecule or an esterified product thereof, (C) a carboxylic acid compound having two pairs of carboxyl groups within its molecule or an esterified product thereof, and (D) a solvent, allows production of polyimide resins having high toughness, thus arriving at the present invention.

That is, the invention also provides a polyimide precursor solution composition containing: (A) a polyamic acid whose molar ratio between repeating units represented by chemical formulas (6) and (7) below (i.e., ratio of (6):(7)) is from 2:8 to 8.5:1.5 and whose molar ratio between the tetracarboxylic acid component and the diamine component (i.e., the tetracarboxylic acid component/the diamine component) is from 0.94 to 0.99; (B) a carboxylic acid compound having at least three pairs of carboxyl groups within its molecule or an esterified product thereof; (C) a carboxylic acid compound having two pairs of carboxyl groups within its molecule or an esterified product thereof; and (D) a solvent (referred to hereinafter as "third invention").

Chemical Formula (6)

[Chem. 2]

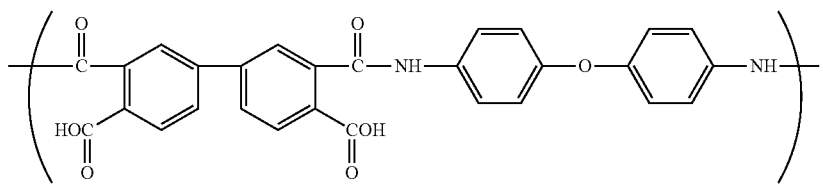

[Chem. 3]

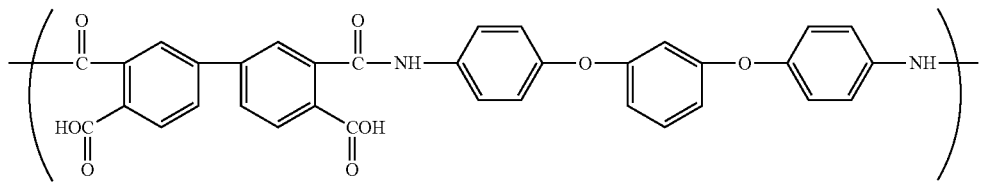
Chemical Formula (7)

Examples of preferred embodiments of the first invention are described below.

1. A polyimide precursor solution composition of the first invention contains: (A) a polyamic acid; (B) a mellitic acid compound represented by chemical formula (1) below; and (D) a solvent.

[Chem. 4]

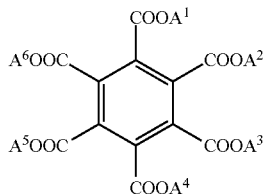
Chemical Formula (1)

(In the formula, $A^1$ to $A^6$ each independently represent a monovalent group selected from a hydrogen atom, an aliphatic group, or an aromatic group.)

2. In the polyimide precursor solution composition of the first invention according to Item 1, a molar ratio between a diamine component and a tetracarboxylic acid component constituting the polyamic acid (A) (the number of moles of the diamine component/the number of moles of the tetracarboxylic acid component) is from 0.98 to 1.05.

3. In the polyimide precursor solution composition of the first invention according to Item 1 or 2, the number of moles of the mellitic acid compound (B) is 0.001 to 0.05 times, by mole, the number of moles of the diamine component constituting the polyamic acid (A).

4. In the polyimide precursor solution composition of the first invention according to any one of Items 1 to 3, the polyamic acid (A) contains a repeating unit represented by chemical formula (3) below:

[Chem. 5]

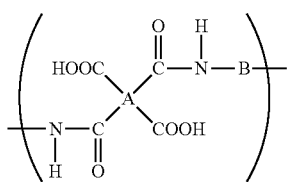
Chemical Formula (3)

(wherein, A is a group selected from tetravalent groups obtained by removing carboxyl groups from tetracarboxylic acids represented by chemical formula (4) below; and B is a group selected from divalent groups obtained by removing amino groups from diamines represented by chemical formula (5) below).

[Chem. 6]

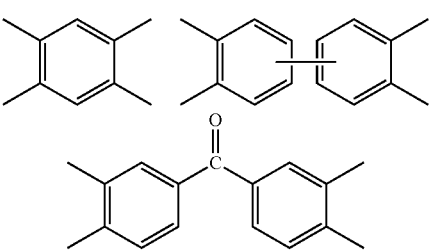
Chemical Formula (4)

[Chem. 7]

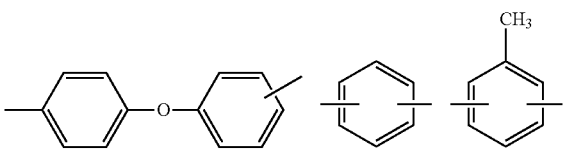
Chemical Formula (5)

5. In the polyimide precursor solution composition of the first invention according to any one of Items 1 to 4, the solution has a viscosity of from 0.1 to 3000 poise at 25° C.

Examples of preferred embodiments of the second invention are described below.

1. A polyimide precursor solution composition contains: (A) a polyamic acid; (B) a carboxylic acid compound having at least three pairs of carboxyl groups within its molecule or an esterified product thereof; (C) a carboxylic acid compound having two pairs of carboxyl groups within its molecule or an esterified product thereof; and (D) a solvent.

2. In the polyimide precursor solution composition of the second invention according to Item 1, the carboxylic acid compound (B) having at least three pairs of carboxyl groups within its molecule or the esterified product thereof has a structure represented by chemical formula (1) below:

[Chem. 8]

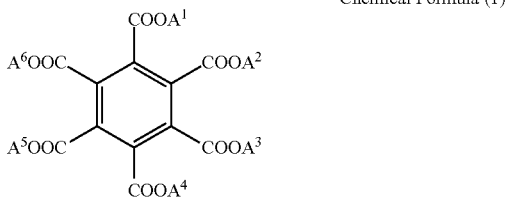
Chemical Formula (1)

(wherein, $A^1$ to $A^6$ each independently represent a monovalent group selected from a hydrogen atom, an alkyl group, or an aromatic group).

3. In the polyimide precursor solution composition of the second invention according to Item 1, the carboxylic acid compound (B) having at least three pairs of carboxyl groups within its molecule or the esterified product thereof has a structure represented by chemical formula (2) below:

[Chem. 9]

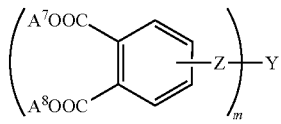

Chemical Formula (2)

(wherein, m represents an integer of 3 or above; Y represents an m-valent hydrocarbon group; Z each independently represent a direct bond or a divalent group selected from —O—, —S—, —CO—, —SO$_2$—, —NHCO—, —COO—, or a C$_{1-6}$ divalent hydrocarbon group; and A$^7$ and A$^8$ each independently represent a monovalent group selected from a hydrogen atom, an alkyl group, or an aromatic group).

4. In the polyimide precursor solution composition of the second invention according to any one of Items 1 to 3, a molar ratio between a diamine component and a tetracarboxylic acid component constituting the polyamic acid (A) (the number of moles of the diamine component/the number of moles of the tetracarboxylic acid component) is from 0.98 to 1.05.

5. In the polyimide precursor solution composition of the second invention according to any one of Items 1 to 4, a total of the number of moles of the carboxylic acid compound (B) having at least three pairs of carboxyl groups within its molecule or the esterified product thereof and the number of moles of the carboxylic acid compound (C) having two pairs of carboxyl groups within its molecule or the esterified product thereof is 0.001 to 0.05 times, by mole, the number of moles of the diamine component constituting the polyamic acid (A).

6. In the polyimide precursor solution composition of the second invention according to any one of Items 1 to 5, the number of moles of the carboxylic acid compound (B) having at least three pairs of carboxyl groups within its molecule or the esterified product thereof is 0.0005 to 0.02 times, by mole, the number of moles of the diamine component constituting the polyamic acid (A).

7. In the polyimide precursor solution composition of the second invention according to any one of Items 1 to 6, the polyamic acid (A) contains a repeating unit represented by chemical formula (3) below:

[Chem. 10]

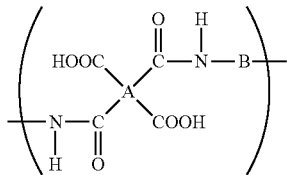

Chemical Formula (3)

(wherein, A is a group selected from tetravalent groups obtained by removing carboxyl groups from tetracarboxylic acids represented by chemical formula (4) below; and B is a group selected from divalent groups obtained by removing amino groups from diamines represented by chemical formula (5) below).

[Chem. 11]

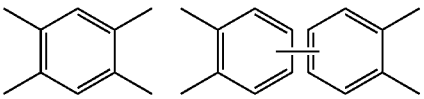

Chemical Formula (4)

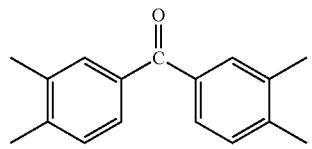

[Chem. 12]

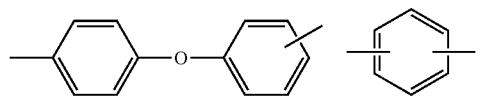

Chemical Formula (5)

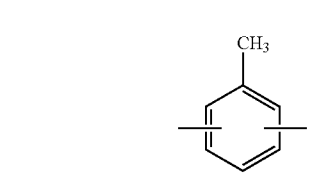

8. The polyimide precursor solution composition of the second invention according to any one of Items 1 to 7 is produced by: preparing a solution of the polyamic acid (A) by reacting the diamine component and the tetracarboxylic acid component in the solvent (D); and then adding and dissolving, into the polyamic acid solution, the carboxylic acid compound (B) having at least three pairs of carboxyl groups within its molecule or the esterified product thereof and the carboxylic acid compound (C) having two pairs of carboxyl groups within its molecule or the esterified product thereof.

9. A polyimide resin is produced by heating the polyimide precursor solution composition of the second invention according to any one of Items 1 to 8 to remove the solvent and cause imidization.

Examples of preferred embodiments of the third invention are described below.

1. A polyimide precursor solution composition contains: (A) a polyamic acid wherein a molar ratio between repeating units represented by chemical formulas (6) and (7) below (ratio of (6):(7)) is from 2:8 to 8.5:1.5 and a molar ratio between the tetracarboxylic acid component and the diamine component (the tetracarboxylic acid component/the diamine component) is from 0.94 to 0.99; (B) a carboxylic acid compound having at least three pairs of carboxyl groups within its molecule or an esterified product thereof; (C) a carboxylic acid compound having two pairs of carboxyl groups within its molecule or an esterified product thereof; and (D) a solvent.

[Chem. 13]

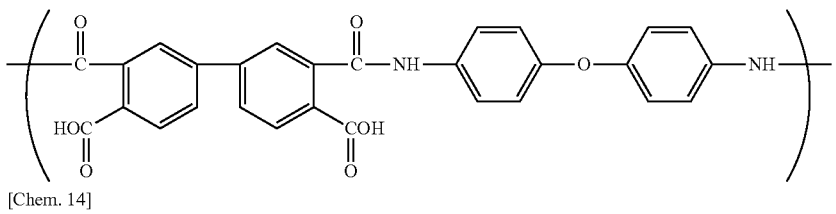

Chemical Formula (6)

[Chem. 14]

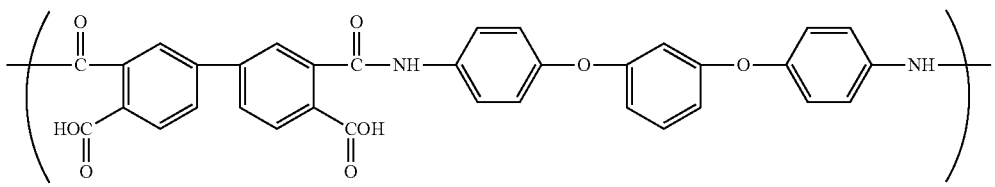

Chemical Formula (7)

2. In the polyimide precursor solution composition of the third invention according to Item 1, the carboxylic acid compound (B) having at least three pairs of carboxyl groups within its molecule or the esterified product thereof has a structure represented by chemical formula (1) below:

[Chem. 15]

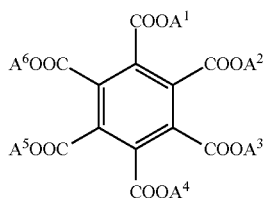

Chemical Formula (1)

(wherein, $A^1$ to $A^6$ each independently represent a monovalent group selected from a hydrogen atom, an alkyl group, or an aromatic group).

3. In the polyimide precursor solution composition of the third invention according to Item 1, the carboxylic acid compound (B) having at least three pairs of carboxyl groups within its molecule or the esterified product thereof has a structure represented by chemical formula (2) below:

[Chem. 16]

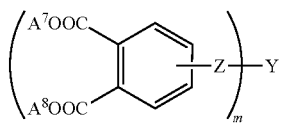

Chemical Formula (2)

(wherein, m represents an integer of 3 or above; Y represents an m-valent hydrocarbon group; Z each independently represent a direct bond or a divalent group selected from —O—, —S—, —CO—, —SO$_2$—, —NHCO—, —COO—, or a $C_{1-6}$ divalent hydrocarbon group; and $A^7$ and $A^8$ each independently represent a monovalent group selected from a hydrogen atom, an alkyl group, or an aromatic group).

4. In the polyimide precursor solution composition of the third invention according to any one of Items 1 to 3, a total of the number of moles of the carboxylic acid compound (B) having at least three pairs of carboxyl groups within its molecule or the esterified product thereof and the number of moles of the carboxylic acid compound (C) having two pairs of carboxyl groups within its molecule or the esterified product thereof is 0.9 to 1.1 times, by mole, the number of moles found by subtracting the number of moles of the diamine component constituting the polyamic acid (A) from the number of moles of the tetracarboxylic acid component constituting the polyamic acid (A).

5. In the polyimide precursor solution composition of the third invention according to any one of Items 1 to 4, the number of moles of the carboxylic acid compound (B) having at least three pairs of carboxyl groups within its molecule or the esterified product thereof is 0.0005 to 0.02 times, by mole, the number of moles found by subtracting the number of moles of the diamine component constituting the polyamic acid (A) from the number of moles of the tetracarboxylic acid component constituting the polyamic acid (A).

6. A polyimide-formed product, a polyimide endless belt, or a polyimide insulating protective film is produced from the polyimide precursor solution composition of the third invention according to any one of Items 1 to 5.

7. An electrode mixture paste for an electrode of an electrochemical element contains the polyimide precursor solution composition of the third invention according to any one of Items 1 to 5 and an electrode active material.

8. An electrode for an electrochemical element is produced by: applying the electrode mixture paste according to Item 7 onto a charge collector; and heating the mixture paste to remove the solvent and cause imidization.

DESCRIPTION OF EMBODIMENTS

First, the first invention will be described.

The polyamic acid (A) used in the first invention can suitably be prepared by causing reaction between a tetracarboxylic acid component and a diamine component while inhibiting imidization. Concrete examples of the tetracarboxylic acid component include: aromatic tetracarboxylic dianhydrides, such as pyromellitic dianhydride, 4,4'-oxydiphthalic dianhydride, 3,3',4,4'-benzophenone tetracarboxylic dianhydride, 3,3',4,4'-diphenylsulfone tetracarboxylic dianhydride, 1,1,1,3,3,3-hexafluoropropane-2,2-diphthalic dianhydride, 3,3',4,4'-biphenyltetracarboxylic dianhydride, 2,3,3',4'-biphenyltetracarboxylic dianhydride, 2,2',3,3'-biphenyltetracarboxylic dianhydride, 1,2,3,4-benzenetetracarboxylic dianhydride, 3,6-difluoro-1,2,4,5-benzenetetracarboxylic dianhydride, 3,3',4,4'-diphenyl ether tetracarboxylic dianhydride, 1,4-dimethoxy-2,3,5,6-benzenetetracarboxylic dianhydride, 1,4-ditrimethylsilyl-2,3,5,6-benzenetetracarboxylic dianhydride, 1,4-bis(3,4-dicarboxylphenoxy)benzene dianhydride, 1,3-bis(3,4-dicarboxylphenoxy)benzene dianhydride, 3,3',4,4'-diphenylmethane tetracarboxylic dianhydride, bis(3,4-dicarboxylphenoxy)dimethylsilane dianhydride, bis(3,4-dicarboxylphenoxy)methylamine dianhydride, 4,4'-bis(3,4-dicarboxylphenoxy)biphenyl dianhydride, 4,4'-bis(3,4-dicarboxylphenoxy)diphenylsulfone dianhydride, 2,3,5,6-naphthalenetetracarboxylic dianhydride, 2,3,5,6-pyridinetetracarboxylic dianhydride, 2,3,6,7-quinolinetetracarboxylic dianhydride, 3,3',4,4'-diphenylsulfidetetracarboxylic dianhydride, 3,3,4,4'-diphenylsulfoxide tetracarboxylic dianhydride, 1,2,8,9-anthracenetetracarboxylic dianhydride, 1,4-bis(3,4-dicarboxylphenylsulfonyl)benzene dianhydride, 1,4-bis(3,4-dicarboxylphenylthio)benzene dianhydride, 3,3''',4,4'''-terphenyltetracarboxylic dianhydride, 4-phenylbenzophenone-3,3'',4,4''-tetracarboxylic dianhydride, 1,4-bis(3,4-dicarboxylbenzoyl)-benzene dianhydride, 3,3''',4,4'''-quaterphenyltetracarboxylic dianhydride, 4,4'-bis(3,4-dicarboxylphenoxy)benzophenone dianhydride, 4,4'-bis(3,4-dicarboxylphenoxy)diphenylsulfoxide dianhydride, naphthalenetetracarboxylic dianhydride, and binaphthalenetetracarboxylic dianhydride; and aromatic tetracarboxylic dianhydrides represented by chemical formula (8) below. These aromatic tetracarboxylic dianhydrides may be used singly, or two or more types may be used mixed. A derivative, such as an esterified product, of the aromatic tetracarboxylic dianhydride may be used as an alternative thereto.

[Chem. 17]

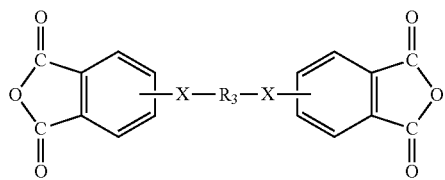

Chemical Formula (8)

(In the formula, X represents an ester bond or an ether bond; and $R_3$ represents a divalent aromatic group, such as benzene, naphthalene, biphenyl, 2,2-bisphenylpropane, 2,2-bisphenylhexafluoropropane, and diphenyl ether.)

Also, a non-aromatic tetracarboxylic acid component may be used. Examples of the non-aromatic tetracarboxylic acid component include: tetracarboxylic dianhydrides, such as butane-1,2,3,4-tetracarboxylic dianhydride, pentane-1,2,4,5-tetracarboxylic dianhydride, cyclobutane tetracarboxylic dianhydride, cyclopentane-1,2,3,4-tetracarboxylic dianhydride, cyclohexane-1,2,4,5-tetracarboxylic dianhydride, cyclohex-1-ene-2,3,5,6-tetracarboxylic dianhydride, 3-ethylcyclohex-1-ene-3-(1,2),5,6-tetracarboxylic dianhydride, 1-methyl-3-ethylcyclohexane-3-(1,2),5,6-tetracarboxylic dianhydride, 1-methyl-3-ethylcyclohex-1-ene-3-(1,2),5,6-tetracarboxylic dianhydride, 1-ethylcyclohexane-1-(1,2),3,4-tetracarboxylic dianhydride, 1-propylcyclohexane-1-(2,3),3,4-tetracarboxylic dianhydride, 1,3-dipropylcyclohexane-1-(2,3),3-(2,3)-tetracarboxylic dianhydride, dicyclohexyl-3,4, 3',4'-tetracarboxylic dianhydride, bicyclo[2.2.1]heptane-2,3,5,6-tetracarboxylic dianhydride, 1-propylcyclohexane-1-(2,3),3,4-tetracarboxylic dianhydride, 1,3-dipropylcyclohexane-1-(2,3),3-(2,3)-tetracarboxylic dianhydride, dicyclohexyl-3,4,3',4'-tetracarboxylic dianhydride, bicyclo[2.2.1]heptane-2,3,5,6-tetracarboxylic dianhydride, bicyclo[2.2.2]octane-2,3,5,6-tetracarboxylic dianhydride, and bicyclo[2.2.2]oct-7-ene-2,3,5,6-tetracarboxylic dianhydride; and derivatives, such as esterified products, of the above. These tetracarboxylic dianhydrides may be used singly, or two or more types may be used mixed. A derivative, such as an esterified product, of the tetracarboxylic dianhydride may be used as an alternative thereto.

Of the above-described tetracarboxylic acid components, it is preferable to use an aromatic tetracarboxylic dianhydride or a derivative, such as an esterified product, thereof in the first invention in order to suitably produce polyimide-resin-formed products having properties equal to or superior to those of straight-chain polyimides through heating at relatively low temperatures and/or in a short time. In particular, it is preferable to use, for example, pyromellitic dianhydride, 3,3',4,4'-biphenyltetracarboxylic dianhydride, 2,3,3',4'-biphenyltetracarboxylic dianhydride, or 3,3',4,4'-benzophenone tetracarboxylic dianhydride, or a derivative such as an esterified product of the above, considering their easy availability, handleability, excellent heat resistance and mechanical properties.

Examples of the diamine component used in the first invention include p-phenylenediamine, 3,3'-dimethyl-4,4'-diaminobiphenyl, 2,2'-dimethyl-4,4'-diaminobiphenyl, 3,3'-dimethoxy-4,4'-diaminobiphenyl, 3,3'-dichloro-4,4'-diaminobiphenyl, 9,10-bis(4-aminophenyl)anthracene, 4,4'-diaminobenzophenone, 4,4'-diaminodiphenylsulfone, 3,3'-diaminodiphenylsulfone, 4,4'-diaminodiphenylsulfoxide, bis[4-(4-aminophenoxy)phenyl]sulfone, bis[4-(3-aminophenoxy)phenyl]sulfone, 4,4'-bis(4-aminophenoxy)biphenyl, 4,4'-bis(3-aminophenoxy)biphenyl, bis[4-(4-aminophenoxy)phenyl]ether, 2,2-bis[4-(4-aminophenoxy)phenyl]propane, 1,1,1,3,3,3-hexafluoro-2,2-bis(4-aminophenyl)propane, 1,1,1,3,3,3-hexafluoro-2,2-bis[4-(4-aminophenoxy)phenyl]propane, 1,1,1,3,3,3-hexafluoro-2,2-bis(3-amino-4-methylphenyl)propane, m-phenylenediamine, 4,4'-diaminodiphenyl ether, 4,4'-diaminodiphenyl sulfide, 3,4'-diaminodiphenyl ether, 1,4-bis(4-aminophenoxy)benzene, 1,3-bis(4-aminophenoxy)benzene, 1,3-bis(3-aminophenoxy)benzene, 1,4-bis(3-aminophenoxy)benzene, 5-amino-2-(p-aminophenyl)benzoxazole, 6-amino-2-(p-aminophenyl)benzoxazole, 5-amino-2-(m-aminophenyl)benzoxazole, 6-amino-2-(m-aminophenyl)benzoxazole, toluidine diamine, and diaminopolysiloxane. The diamine component may be used singly, or two or more types may be used mixed.

Of the above-described diamine components, it is preferable to use an aromatic diamine in the first invention in order to suitably produce polyimide-resin-formed products having properties equal to or superior to those of straight-chain polyimides through heating at relatively low temperatures and/or in a short time. In particular, it is preferable to use, for example, m-phenylenediamine, p-phenylenediamine, 4,4'-diaminodiphenyl ether, or toluidine diamine, considering their easy availability, handleability, excellent heat resistance and mechanical properties.

There is no particular limitation to the combination between the tetracarboxylic acid component and the diamine component, but the glass transition temperature of the polyimide produced by heating the polyamic acid prepared from the combination may reach 250° C. or above, more preferably 255° C. or above, even more preferably 260° C. or above, and particularly preferably 270° C. or above. The glass transition temperature can suitably be measured through such methods as differential scanning calorimetry (DSC), dynamic viscoelastic measurement, and thermomechanical analysis (TMA).

More specifically, in the present invention, the polyamic acid (A) is preferably an aromatic polyamic acid composed of an aromatic tetracarboxylic acid component and an aromatic diamine component. More preferably, the glass transition temperature of the polyimide produced by heating the polyamic acid may be 250° C. or above, more preferably 255° C. or above, even more preferably 260° C. or above, particularly preferably 270° C. or above. Even more preferably, the polyamic acid (A) has a repeating unit represented by chemical formula (3) below:

[Chem. 18]

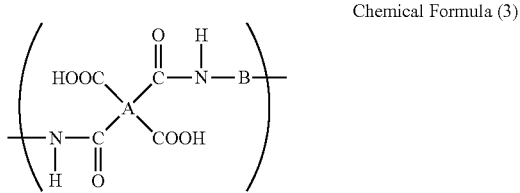

Chemical Formula (3)

(wherein, A is a group selected from tetravalent groups obtained by removing carboxyl groups from tetracarboxylic acids represented by chemical formula (4) below; and B is a group selected from divalent groups obtained by removing amino groups from diamines represented by chemical formula (5) below).

[Chem. 19]

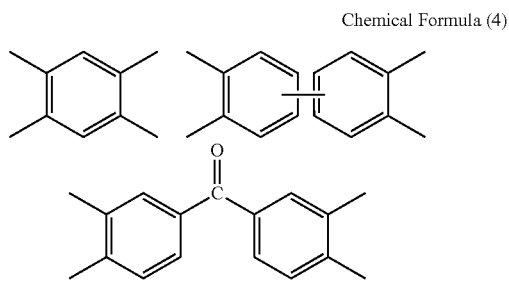

Chemical Formula (4)

[Chem. 20]

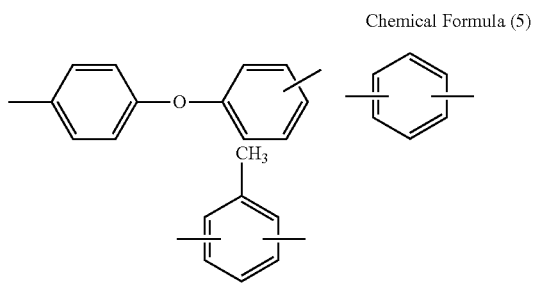

Chemical Formula (5)

There is no limitation on how to prepare the polyamic acid (A) used in the first invention, and known methods may suitably be used. For example, a polyamic acid can suitably be prepared by reacting, in an inert gas atmosphere, a tetracarboxylic dianhydride and a diamine in an organic solvent for 0.5 to 78 hours at such a concentration that the polyamic acid concentration becomes 5% to 60% by mass. In doing so, the polyamic acid can suitably be prepared by, for example: (A) adding the acid dianhydride at once, or in several portions, to a solution containing the diamine, to cause reaction between the dianhydride and the diamine; (B) adding the diamine and the acid dianhydride to a solvent at once, to cause the reaction; or (C) adding both the diamine and the acid dianhydride in several portions to cause the reaction. Any temperature range may be adopted for the reaction as long as imidization can be inhibited, the temperature range being preferably 5° C. to 80° C., more preferably 10° C. to 70° C., even more preferably 10° C. to 65° C. Temperatures lower than 5° C. delay the reaction, thus requiring long periods of time therefor; whereas temperatures higher than 80° C. may promote imidization and give rise to precipitation etc., which is also not preferable.

Any known organic solvent that is used for the preparation of polyamic acids may suitably be used for the organic solvent to be used for preparing the polyamic acid (A), and examples include N,N-dimethylformamide, N,N-dimethylacetamide, N,N-diethylacetamide, N-methyl-2-pyrrolidone, N-ethyl-2-pyrrolidone, 1,3-dimethyl-2-imidazolidinone, N-methylcaprolactam, hexamethylphosphorotriamide, 1,2-dimethoxyethane, bis(2-methoxyethyl) ether, 1,2-bis(2-methoxyethoxy)ethane, tetrahydrofuran, bis[2-(2-methoxyethoxy)ethyl]ether, 1,4-dioxane, dimethylsulfoxide, dimethylsulfone, diphenyl ether, sulfolane, diphenylsulfone, tetramethylurea, and anisole. The organic solvent may be used singly, or two or more types may be used mixed.

The molar ratio between the diamine component and the tetracarboxylic acid component constituting the polyamic acid (A) used in the first invention (i.e., the number of moles of the diamine component/the number of moles of the tetracarboxylic acid component) is from 0.98 to 1.05, preferably 0.985 to 1.045, more preferably 0.985 to 0.999 or 1.001 to 1.045, and even more preferably 0.990 to 0.999 or 1.001 to 1.040. Molar ratios outside the above-described range are not preferable, because the increase in the molecular weight of the polyimide at the time of heating may become insufficient and the properties of the polyimide-resin-formed product may be impaired.

A suitable polyamic acid (A) for use in the present invention has a logarithmic viscosity ranging from 0.01 to 4 (solvent: N-methyl-2-pyrrolidone; concentration: 0.5 g/100 ml; temperature: 30° C.).

The polyimide precursor solution composition of the first invention can suitably be prepared by adding and dissolving, into the solution of the polyamic acid (A) prepared as above, the carboxylic acid compound (B) having at least three pairs of carboxyl groups within its molecule or the esterified product thereof at a relatively low temperature, preferably at temperatures equal to or below 80° C., more preferably at room temperature, and stirring the mixture as necessary.

The solution of the polyamic acid (A) to be used for preparing the polyimide precursor solution composition may be used as prepared, or may be used by first removing the organic solvent to isolate the polyamic acid and then dissolving the isolated polyamic acid into an organic solvent again.

The concentration of the polyamic acid (A) solution to be used for preparing the polyimide precursor solution composition of the first invention is 3% to 60%, preferably 5% to 45%, more preferably 5% to 40%, even more preferably 5% to 35%, by mass. Concentrations of less than 3% by mass are not preferable, because this increases the amount of organic solvent that needs to be removed by heating; whereas concentrations above 60% by mass are also not preferable, because this increases the solution viscosity and makes molding/forming difficult. Note that the above-described organic solvent to be used for preparing the polyamic acid (A) may suitably be used as the organic solvent for adjusting the concentration.

The carboxylic acid compound (B) having at least three pairs of carboxyl groups within its molecule or the esterified product thereof used in the first invention is a carboxylic acid compound having at least three pairs of carboxyl groups within its molecule (i.e., at least six carboxyl groups in its molecule) or an esterified product thereof, each pair capable of forming an imide ring through reaction with an amino group. Therefore, preferably, the two carboxyl groups, constituting each pair, are bonded respectively to two carbon atoms adjacent to and bonded to one another. During the course of heating the polyimide precursor solution composition of the first invention, the carboxylic acid compound, or the esterified product thereof, can react with the amino groups at the ends of three polyamic acids, to form imide rings therewith. In this way, a cross-linking or long-chain branched structure can partially be introduced into the polyimide-resin-formed product produced by heating.

The carboxylic acid compound (B) having at least three pairs of carboxyl groups within its molecule or the esterified product thereof may have any structure as long as it has the above-described function, but is preferably a mellitic acid compound (i.e., mellitic acid or an esterified product thereof) having a structure represented by the chemical formula (1) shown above. More specifically, examples of $A^1$ to $A^6$ in chemical formula (1) include: hydrogen atoms in case of mellitic acid; and in case of esterified products thereof, aliphatic groups, such as methyl, ethyl, propyl, isopropyl, butyl, hydroxyethyl, and methoxyethyl, and preferably $C_{1-6}$ aliphatic groups optionally containing a hydroxyl group or an ether bond, and aromatic groups, such as phenyl and benzyl, and preferably $C_{6-12}$ aromatic groups. Particularly preferable among the above are mellitic acid, in which all of $A^1$ to $A^6$ are hydrogen atoms, and esterified products thereof in which at least some portions have been esterified by methyl and/or ethyl, from the standpoint of handleability and easy availability.

Concrete examples preferably include mellitic acid, methyl mellitate, dimethyl mellitate, trimethyl mellitate, ethyl mellitate, diethyl mellitate, triethyl mellitate, propyl mellitate, dipropyl mellitate, tripropyl mellitate, butyl mellitate, dibutyl mellitate, tributyl mellitate, phenyl mellitate, diphenyl mellitate, and triphenyl mellitate.

The mellitic acid compound may be used singly, or several types may be used mixed. Note that in cases where the mellitic acid compound is anhydridized and acid dianhydride groups and/or acid trianhydride groups come to occupy 5% or more, especially 10% or more, of the total number of carboxyl groups, the polyamic acid solution composition may become unstable in terms of viscosity or may gelate, thus not preferable.

Assuming that the number of moles of the diamine component constituting the polyamic acid (A) is one (1), the amount of the mellitic acid compound added ranges from 0.001 to 0.05 times, more preferably from 0.001 to 0.04 times, even more preferably from 0.0015 to 0.03 times, by mole. An addition amount of less than 0.001 times by mole will make it difficult to achieve the effects of the present invention; whereas an addition amount of more than 0.05 times by mole may impair the properties of the resultant polyimide-resin-formed product, which is also not preferable.

In the polyimide precursor solution composition of the first invention, a poor solvent of the polyamic acid may be added besides the organic solvent preferably usable for the preparation of the polyamic acid (A) to an extent that will not impair dissolubility. Concrete examples of poor solvents include: xylene; ethylcellosolve; diglyme; dioxane; and alcohols such as methanol, ethanol, n-propanol, iso-propanol, n-butanol, sec-butanol, n-amyl alcohol, n-hexanol, and n-heptanol.

The polyimide precursor solution composition of the first invention can easily be adjusted in terms of viscosity, e.g., its viscosity can easily be decreased, and also, its concentration can easily be increased. Further, its solution viscosity is stable, and the solution composition can suitably produce polyimide-resin-formed products, such as polyimide films, having properties equal to or superior to those of straight-chain polyimides through heating at relatively low temperatures and/or in a short time. Any known method for producing common polyimides may be used for the present heating method. For example, a polyimide-resin-formed product (a polyimide film) may be produced by: applying or casting the polyimide precursor solution composition onto a base material; heating the applied layer at a relatively low temperature using, for example, a hot-air dryer to remove the solvent; and then further heating the applied layer as-is on the base material, or after peeling it off from the base material as necessary, at higher temperatures, to obtain the polyimide product (film). The maximum temperature for this heating process is within the range of preferably 180° C. to 500° C., more preferably 190° C. to 480° C., even more preferably 200° C. to 470° C., particularly preferably 210° C. to 460° C. A maximum heating temperature below 180° C. is not preferable, because this will require a longer time for the imidization and will impair the properties of the polyimide-resin-formed product. Meanwhile, a maximum temperature over 500° C. is also not preferable, because this may promote thermal decomposition of the polyimide resin and impair its properties.

Although not limited to the following, the polyimide precursor solution composition of the first invention has a polyamic acid concentration of 3% to 60% by mass, preferably 5% to 50% by mass, and more preferably 5% to 35% by mass, and a solution viscosity of 0.1 to 3000 poise, preferably 0.1 to 1000 poise, more preferably 0.5 to 500 poise, and particularly preferably 1 to 200 poise, at 25° C., although not limited thereto. Further, depending on the usage, the polyimide precursor solution composition of the first invention may also suitably contain other organic or inorganic additives, such as extenders, fillers, reinforcement materials, pigments, dyes, and parting agents.

Now the second invention will be described.

The polyimide precursor solution composition of the second invention further contains (C) a carboxylic acid compound having two pairs of carboxyl groups within its molecule or an esterified product thereof, in addition to "(A) the polyamic acid, (B) the carboxylic acid compound having at least three pairs of carboxyl groups within its molecule or the esterified product thereof, and (D) the solvent" which constitute the polyimide precursor solution composition of the first invention.

The polyimide precursor solution composition of the second invention can be prepared substantially in the same way as the polyimide precursor solution composition of the first invention, except that the carboxylic acid compound (C) having two pairs of carboxyl groups within its molecule or the esterified product thereof is also added, along with the carboxylic acid compound (B) having at least three pairs of carboxyl groups within its molecule or the esterified product thereof, to the solution of the polyamic acid (A) prepared as described above.

The compounds given as examples in the first invention can be used for the carboxylic acid compound (B) having at least three pairs of carboxyl groups within its molecule or the esterified product thereof in the second invention. Preferable examples include mellitic acid compounds having the structure represented by the above-shown chemical formula (1) and compounds having the structure represented by the above-shown chemical formula (2). Concrete examples of the compounds having the structure represented by the above-shown chemical formula (2) preferably include: 1,3,5-tris(3,4-dicarboxyphenoxy)benzene, 1,3,5-tris(3,4-dicarboxybenzoyloxy)benzene, 4,4',4''-tris(3,4-dicarboxyphenoxy)triphenylmethane, 4,4',4''-tris(3,4-dicarboxyphenoxy)-1,1,1-triphenylethane, 2,4,6-tris(3,4-dicarboxyphenoxy)pyridine, 2,4,6-tris(3,4-dicarboxybenzoyloxy)-1,3,5-triazine, 4,4',4''-tris(3,4-dicarboxybenzoyloxy)triphenylmethane, 4,4',4''-tris(3,4-dicarboxybenzoyloxy)-1,1,1-triphenylethane, and 2,4,6-tris(3,4-dicarboxybenzoyloxy)pyridine; esterified products of the above; and mixtures of the above.

The carboxylic acid compound (C) having two pairs of carboxyl groups within its molecule or the esterified product thereof used in the second invention is a carboxylic acid compound having two pairs of carboxyl groups within its molecule (i.e., four carboxyl groups in its molecule) or an esterified product thereof, each pair capable of forming an imide ring through reaction with an amino group. Therefore, preferably, the two carboxyl groups, constituting each pair, are bonded respectively to two carbon atoms adjacent to and bonded to one another. During the course of heating the polyimide precursor solution composition of the second invention, the carboxylic acid compound, or the esterified product thereof, can react with the amino groups at the ends of two polyamic acids, to form imide rings therewith. It is believed that this heating process can sufficiently increase the molecular weight of the polyimide.

For the carboxylic acid compound (C) having two pairs of carboxyl groups within its molecule or the esterified product thereof, it is possible to suitably use a tetracarboxylic acid compound, or an esterified product thereof, which may serve as the tetracarboxylic acid component of a polyimide. In the second invention, it is preferable to use a tetracarboxylic acid compound, or an esterified product thereof, similar to the tetracarboxylic acid component preferably used for the polyamic acid (A), because in this way it is possible to suitably produce polyimide-resin-formed products, such as polyimide films, having properties equal to or superior to those of straight-chain polyimides through heating at relatively low temperatures and/or in a short time. It is particularly preferable to use the same tetracarboxylic acid compound, or esterified product thereof, as the tetracarboxylic acid component used in the polyamic acid (A).

In the second invention, it is necessary that the composition contains both the carboxylic acid compound (B) having at least three pairs of carboxyl groups within its molecule or the esterified product thereof and the carboxylic acid compound (C) having two pairs of carboxyl groups within its molecule or the esterified product thereof. Without the carboxylic acid compound (B) having at least three pairs of carboxyl groups within its molecule or the esterified product thereof, it is impossible to achieve the effect of the second invention of suitably producing polyimide-resin-formed products, such as polyimide films, having properties equal to or superior to those of straight-chain polyimides through heating at relatively low temperatures and/or in a short time. On the other hand, without the carboxylic acid compound (C) having two pairs of carboxyl groups within its molecule or the esterified product thereof, it is impossible to produce, with good reproducibility, polyimide-resin-formed products, such as polyimide films, having properties equal to or superior to those of straight-chain polyimides and also the formed products tend to become brittle, although the reasons behind this are yet to be found.

The addition amount of the carboxylic acid compound (B) having at least three pairs of carboxyl groups within its molecule or the esterified product thereof and the carboxylic acid compound (C) having two pairs of carboxyl groups within its molecule or the esterified product thereof is such that, assuming that the number of moles of the diamine component constituting the polyamic acid (A) is one (1), the total of the number of moles of the carboxylic acid compound (B) having at least three pairs of carboxyl groups within its molecule or the esterified product thereof and the number of moles of the carboxylic acid compound (C) having two pairs of carboxyl groups within its molecule or the esterified product thereof ranges from 0.001 to 0.05 times, preferably from 0.001 to 0.04 times, more preferably from 0.0015 to 0.03 times, by mole. An addition amount of less than 0.001 times by mole may pose difficulty in achieving sufficient effects; whereas an addition amount of more than 0.05 times by mole may impair the properties of the resultant polyimide-resin-formed product, which is also not preferable.

Further, assuming that the number of moles of the diamine component constituting the polyamic acid (A) is one (1), the addition amount of the carboxylic acid compound (B) having at least three pairs of carboxyl groups within its molecule or the esterified product thereof is preferably within the range of 0.0005 to 0.02 times, preferably 0.0007 to 0.015 times, and more preferably 0.001 to 0.01 times, by mole. An addition amount exceeding 0.02 times by mole is not preferable, because this may impair the flexibility and/or the toughness of the polyimide resin produced from the polyimide precursor solution composition or may provide the polyimide resin with properties completely different from those of a straight-chain polyimide that does not contain the compound (B). Meanwhile, an addition amount of less than 0.0005 times by mole is also not preferable, because the effects of the second invention cannot be achieved.

Furthermore, assuming that the number of moles of the diamine component constituting the polyamic acid (A) is one (1), the addition amount of the carboxylic acid compound (C) having two pairs of carboxyl groups within its molecule or the esterified product thereof is preferably within the range of 0.0005 to 0.0495 times, preferably 0.001 to 0.0493 times, and more preferably 0.002 to 0.049 times, by mole. An addition amount of less than 0.0005 times by mole is not preferable, because there is a high possibility that this may impair the flexibility and/or the toughness of the polyimide resin produced from the polyimide precursor solution composition. Meanwhile, an addition amount exceeding 0.0495 times by mole is also not preferable, because it becomes difficult to achieve the effects of the second invention.

Also in the polyimide precursor solution composition of the second invention, a poor solvent of the polyamic acid may be added besides the organic solvent preferably usable for the preparation of the polyamic acid (A) to an extent that will not impair dissolubility. Concrete examples of poor solvents include those given as examples in the first invention.

As with the polyimide precursor solution composition of the first invention, the polyimide precursor solution composition of the second invention can easily be adjusted in terms of viscosity, e.g., its viscosity can easily be decreased, and also, its concentration can easily be increased. Further, its solution viscosity is stable, and the solution composition can suitably produce polyimide-resin-formed products, such as polyimide films, having properties equal to or superior to those of straight-chain polyimides through heating at relatively low temperatures and/or in a short time. The heating method used herein is the same as that for the polyimide precursor solution composition of the first invention.

Although not limited to the following, the polyimide precursor solution composition of the second invention has a polyamic acid concentration of 3% to 60% by mass, preferably 5% to 50% by mass, and more preferably 5% to 35% by mass, and a solution viscosity of 0.1 to 3000 poise, preferably 0.1 to 1000 poise, more preferably 0.5 to 500 poise, and particularly preferably 1 to 200 poise, at 25° C., although not limited thereto. Further, depending on the usage, the polyimide precursor solution composition may also suitably contain other organic or inorganic additives, such as extenders, fillers, reinforcement materials, pigments, dyes, and parting agents.

Now, the third invention will be described.

The polyimide precursor solution composition of the third invention contains "(A) the polyamic acid, (B) the carboxylic acid compound having at least three pairs of carboxyl groups within its molecule or the esterified product thereof, (C) the carboxylic acid compound having two pairs of carboxyl groups within its molecule or the esterified product thereof, and (D) the solvent" which constitute the polyimide precursor solution composition of the second invention; wherein, in the polyamic acid (A), the molar ratio between repeating units represented by chemical formulas (6) and (7) below (i.e., ratio of (6):(7)) is from 2:8 to 8.5:1.5, and the molar ratio between the tetracarboxylic acid component and the diamine component (the tetracarboxylic acid component/the diamine component) is from 0.94 to 0.99.

Further, the molar ratio between the tetracarboxylic acid component and the diamine component (the tetracarboxylic acid component/the diamine component) ranges from 0.94 to 0.99, preferably from 0.95 to 0.985, even more preferably from 0.96 to 0.98. Ratios smaller than 0.94 may impair the toughness when formed into a polyimide resin or may make the solution viscosity too small. On the other hand, ratios higher than 0.99 may make the solution viscosity too high, resulting in poor formability and difficulty in mixing the electrode active material powder or evenly applying the composition onto a charge collector.

The polyamic acid (A) can be prepared by adding, at once or in several stages, the tetracarboxylic acid component to a solution prepared by dissolving the diamine components into a solvent, and stirring the mixture. The reaction temperature is preferably from 10° C. to 60° C., more preferably from 15° C. to 55° C., and even more preferably from 15° C. to 50° C. Reaction temperatures below 10° C. are not preferable, as the reaction becomes slow; whereas reaction temperatures above 60° C. are also not preferable, as the solution viscosity may become low. The reaction time is preferably within the range of 0.5 hours to 72 hours, more preferably 1 hour to 60 hours, and even more preferably 1.5 hours to 48 hours. A reaction time shorter than 0.5 hours may result in insufficient reaction, thus making the viscosity of the synthesized polyamic acid solution unstable. On the other hand, a reaction time longer than 72 hours is not preferable in terms of productivity.

A known organic solvent may be used for preparing the polyamic acid (A), and examples include N,N-dimethylformamide, N,N-dimethylacetamide, N,N-diethylacetamide, N-methyl-2-pyrrolidone, N-ethyl-2-pyrrolidone, 1,3-dimethyl-2-imidazolidinone, N-methylcaprolactam, hexamethylphosphorotriamide, 1,2-dimethoxyethane, bis(2-methoxyethyl) ether, 1,2-bis(2-methoxyethoxy)ethane,

[Chem. 21]

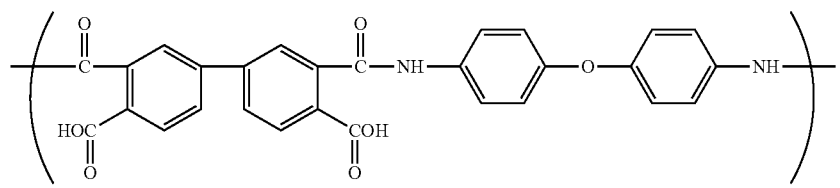

Chemical Formula (6)

[Chem. 22]

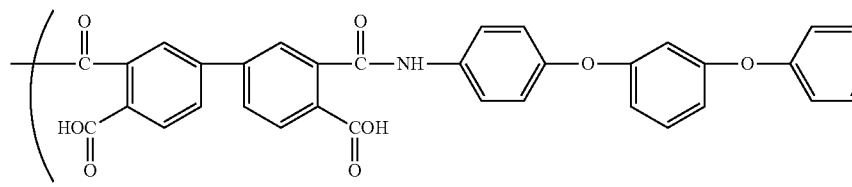

Chemical Formula (7)

The tetracarboxylic acid component constituting the polyamic acid (A) used in the third invention is 3,3',4,4'-biphenyltetracarboxylic dianhydride. The diamine components are 4-oxydianiline (ODA) and 1,3-bis(4-aminophenoxy)benzene (TPE-R), and it is necessary to use both these components. The molar ratio between the components (ODA: TPE-R) is preferably within the range of 2:8 to 8.5:1.5, more preferably 3:7 to 8.5:1.5, even more preferably 3:7 to 8:2. Outside the above-described range, the energy at break and/or elongation at break of the resultant polyimide resin may become small.

tetrahydrofuran, bis[2-(2-methoxyethoxy)ethyl]ether, 1,4-dioxane, dimethylsulfoxide, dimethylsulfone, diphenyl ether, sulfolane, diphenylsulfone, tetramethylurea, anisole, m-cresol, phenol, and γ-butyrolactone. The solvent may be used singly, or two or more types may be used mixed. From the standpoint of dissolubility of the polyamic acid and safety, preferable among the above are N,N-dimethylacetamide, N,N-diethylacetamide, N-methyl-2-pyrrolidone, N-ethyl-2-pyrrolidone, 1,3-dimethyl-2-imidazolidinone, and γ-butyrolactone, and particularly preferable are N-methyl-2-pyrrolidone, N-ethyl-2-pyrrolidone, and γ-butyrolactone.

As for the solution of the polyamic acid (A) to be used for preparing the polyimide precursor solution composition of the third invention, it is possible to use a solution obtained by first isolating the polyamic acid (A) prepared as above by, for example, placing the polyamic acid solution into a poor solvent to cause precipitation and then dissolving the isolated polyamic acid in a solvent again. Instead, the solution prepared as above may be used as-is, without isolating the polyamic acid, or may be used after simply diluting the same. From the standpoint of productivity and cost, it is preferable to use the solution as-is, without isolating the polyamic acid.

The concentration of the polyamic acid (A) solution is preferably 5 wt % to 45 wt %, more preferably 10 wt % to 40 wt %, even more preferably 15 wt % to 35 wt %. If the concentration is lower than 5 wt %, the solution viscosity may become too low; whereas if the concentration is higher than 45 wt %, the solution may lose flowability. The rotational viscosity of the solution at 25° C. is preferably 1 to 300 poise, more preferably 5 to 275 poise, even more preferably 10 to 250 poise. Viscosities higher than 300 poise may pose difficulty in forming/molding, such as application onto a base material, in mixing the active material powder, or in evenly applying the composition onto a charge collector; whereas viscosities lower than 1 poise may impair the toughness of the polyimide resin after heating/drying and imidization. As for the solvent, the organic solvent used for preparing the polyamic acid can suitably be used here.

The compounds given as examples in the first invention can be used for the carboxylic acid compound (B) having at least three pairs of carboxyl groups within its molecule or the esterified product thereof in the third invention. Preferable examples include mellitic acid compounds having the structure represented by the above-shown chemical formula (1) and compounds having the structure represented by the above-shown chemical formula (2).

Concrete examples of the carboxylic acid compound (C) having two pairs of carboxyl groups within its molecule or the esterified product thereof to be used in the third invention preferably include: pyromellitic acid, 4,4'-oxydiphthalic acid, 3,3',4,4'-benzophenone tetracarboxylic acid, 3,3',4,4'-diphenylsulfone tetracarboxylic acid, 1,1,1,3,3,3-hexafluoropropane-2,2-diphthalic acid, 3,3',4,4'-biphenyltetracarboxylic acid, 2,3,3',4'-biphenyltetracarboxylic acid, 2,2',3,3'-biphenyltetracarboxylic acid, 1,2,3,4-benzene tetracarboxylic acid, 3,6-difluoro-1,2,4,5-benzene tetracarboxylic acid, 3,3',4,4'-diphenyl ether tetracarboxylic acid, 1,4-bis(3,4-dicarboxylphenoxy)benzene, 1,3-bis(3,4-dicarboxylphenoxy)benzene, and naphthalene tetracarboxylic acid; esters of the above, such as dimethyl esters, diethyl esters, dipropyl esters, diisopropyl esters, and dibutyl esters; and mixtures of the above.

Preferable among the above are pyromellitic acid, 4,4'-oxydiphthalic acid, 3,3',4,4'-benzophenone tetracarboxylic acid, 3,3',4,4'-biphenyltetracarboxylic acid, and 2,3,3',4'-biphenyltetracarboxylic acid, and dimethyl esters and diethyl esters thereof, and even more preferable are 3,3',4,4'-biphenyltetracarboxylic acid and 2,3,3',4'-biphenyltetracarboxylic acid. These compounds may be used singly, or several types may be used. Note that in cases where the amount of acid dianhydrides becomes equal to or above 5%, the viscosity of the polyamic acid solution may become unstable.

The polyimide precursor solution composition of the third invention can be prepared by adding, to a solution of the polyamic acid (A) having the specific structure described above, the carboxylic acid compound (B) having at least three pairs of carboxyl groups within its molecule or the esterified product thereof and the carboxylic acid compound (C) having two pairs of carboxyl groups within its molecule or the esterified product thereof and stirring the mixture to dissolve the compounds. The temperature for dissolution is preferably 10° C. to 60° C., more preferably 15° C. to 50° C., even more preferably 15° C. to 45° C. Temperatures lower than 10° C. will retard the dissolution speed, whereas temperatures higher than 60° C. may lower the viscosity of the solution composition and/or impair the toughness of the resultant polyimide resin.

The addition amount of the carboxylic acid compound (B) having at least three pairs of carboxyl groups within its molecule or the esterified product thereof and the carboxylic acid compound (C) having two pairs of carboxyl groups within its molecule or the esterified product thereof is such that, assuming that the number of moles found by subtracting the number of moles of the tetracarboxylic acid component constituting the polyamic acid (A) from the number of moles of the diamine component constituting the same is one (1), the total of the number of moles of the carboxylic acid compound (B) having at least three pairs of carboxyl groups within its molecule or the esterified product thereof and the number of moles of the carboxylic acid compound (C) having two pairs of carboxyl groups within its molecule or the esterified product thereof is preferably 0.9 to 1.1 times, more preferably 0.95 to 1.05 times, even more preferably 0.97 to 1.03 times, and most preferably 0.99 to 1.01 times, by mole. Outside the above-described range, the toughness of the resultant polyimide-resin-formed product may be impaired.

Further, assuming that the number of moles found by subtracting the number of moles of the tetracarboxylic acid component constituting the polyamic acid (A) from the number of moles of the diamine component constituting the same is one (1), the preferable addition amount of the carboxylic acid compound (B) having at least three pairs of carboxyl groups within its molecule or the esterified product thereof is 0.0005 to 0.02 times, preferably 0.0005 to 0.015 times, and more preferably 0.0007 to 0.01 times, by mole. An addition amount exceeding 0.02 times by mole may impair the flexibility and/or the toughness of the polyimide resin produced from the polyimide precursor solution composition or may provide the polyimide resin with properties completely different from those of a straight-chain polyimide that does not contain the compound (B). On the other hand, an addition amount of less than 0.0005 times by mole may pose difficulty in achieving the effects of the third invention.

The addition amount of the carboxylic acid compound (C) having two pairs of carboxyl groups within its molecule or the esterified product thereof is adjusted such that the total of the number of moles of the carboxylic acid compound (B) having at least three pairs of carboxyl groups within its molecule or the esterified product thereof and the number of moles of the carboxylic acid compound (C) having two pairs of carboxyl groups within its molecule or the esterified product thereof falls within the above-described preferred range.

In the polyimide precursor solution composition of the third invention, it is preferable to adjust the polyamic acid concentration to 3% to 60% by mass, preferably 5% to 50% by mass, and more preferably 5% to 35% by mass, and the solution viscosity to 0.1 to 3000 poise, preferably 0.1 to 1000 poise, more preferably 0.5 to 500 poise, and particularly preferably 1 to 200 poise, at 25° C. Further, depending on the usage, the polyimide precursor solution composition may also contain other organic or inorganic additives, such as extenders, fillers, reinforcement materials, pigments, dyes, and parting agents.

A polyimide resin can be produced by: casting or applying the polyimide precursor solution composition of the third invention prepared as above onto a base material at temperatures equal to or below 100° C.; and heating the solution composition at temperatures ranging from 100° C. to 400° C., more preferably from 120° C. to 380° C., even more preferably from 150° C. to 350° C., to remove the solvent and cause imidization. Casting or application at temperatures above 100° C. may lower the solution viscosity and make casting or application difficult. Heating at temperatures outside the above-described range may result in insufficient imidization reaction and impair the properties of the formed product. The heating process may be done in multiple stages to prevent foaming or powdering. During this process, the formed product may be peeled off from the base material once the formed product becomes self-supportable and may then be subjected to further heating. The maximum temperature therefor is preferably 150° C. or above, more preferably 180° C. or above, even more preferably 220° C. or above. The total heating time is preferably within the range of 3 minutes to 48 hours. A heating time longer than 48 hours is not preferable from the standpoint of productivity, and a heating time shorter than 3 minutes is also not preferable because this may result in insufficient imidization reaction and/or solvent removal.

It is preferable that the thus-obtained polyimide resin has a tensile elongation at break of from 110% to 250% and a tensile energy at break of 130 J/cm$^3$ or above from the standpoint of providing a toughness desired of a polyimide-formed product or an electrode binder resin.

It is possible to prepare a mixture paste for an electrode (electrode mixture paste) by mixing the polyimide precursor solution composition of the first, second, or third invention—particularly the polyimide precursor solution composition of the third invention—with e.g. an electrode active material within a temperature range of 10° C. to 60° C. Any known electrode active material may be used, but carbon, silicon, and tin are preferable. An electrode for an electrochemical element can be produced by applying the electrode mixture paste onto a conductive charge collector, such as copper or aluminum, and heating the paste to remove the solvent therefrom and cause imidization. The heating temperature therefor is preferably 120° C. to 400° C., more preferably 150° C. to 400° C., even more preferably 200° C. to 370° C. Below 100° C., the resin's binding ability may be insufficient for a binder resin; whereas at temperatures equal to or above 400° C., the produced polyimide resin may decompose. There is no particular limitation in how to conduct heating provided that no foams are created, but it is preferable to perform multi-stage heating starting from a lower temperature.

Further, a cylindrical formed product produced from the polyimide precursor solution composition of the first, second, or third invention—particularly the polyimide precursor solution composition of the third invention—using e.g. a metal drum can be used as an endless belt. Furthermore, the polyimide precursor solution composition can be used for an insulating protective film by forming a polyimide film by applying or casting the solution composition onto e.g. a wiring board and heating the same.

EXAMPLES

The present invention will now be described in further detail through Examples thereof. The invention, however, is not to be limited to these Examples. First, the methods employed in the Examples for measuring properties will be described.

Note that Example 1 is on the first invention, Examples 2 to 7 are on the second invention, and Examples 8 to 10 are on the third invention.

Solution Viscosity:

The solution viscosity of the polyamic acid solution composition and the polyimide precursor solution composition was measured using an E-type viscometer at 25° C.

Mechanical Properties (Tensile Test):

The tensile test was conducted using "EZTest" from Shimadzu Corporation in an atmosphere of 25° C., 50% RH by stretching a dumbbell-shaped specimen at a speed of 5 mm/minute. The elastic modulus, strength at yield point, elongation at break, and strength at break were found from the tensile break data. The specimen used was 4 mm wide and had a gauge length of 26.32 mm. Measurement was conducted at least five (5) times for each specimen, to find the arithmetic mean.

Example 1

To 221 g of N-methyl-2-pyrrolidone (also abbreviated hereinafter as "NMP") was dissolved 20.02 g (0.100 mol) of 4,4'-diaminodiphenyl ether (also abbreviated hereinafter as "ODA"). To this solution was added 28.54 g (0.097 mol) of 3,3',4,4'-biphenyltetracarboxylic dianhydride (also abbreviated hereinafter as "s-BPDA"), and the mixture was stirred for 24 hours at 25° C. until the s-BPDA dissolved and the solution became viscous, to obtain a solution of polyamic acid (A). The concentration of the polyamic acid in the solution was 18% by mass and the solution viscosity was 41 poise. To this solution was added 0.68 g (0.002 mol; 0.02 times by mole the number of moles of ODA) of mellitic acid, to prepare a polyimide precursor solution composition. The viscosity of the prepared polyimide precursor solution composition was 41 poise, which hardly changed after storage for 3 days at room temperature.

The prepared polyimide precursor solution composition was casted onto a glass plate and dried with hot air for 30 minutes at 120° C. The dried film was peeled off from the glass plate, fixed in a metal frame, and heated for 10 minutes at 250° C., to produce a 40-μm-thick polyimide film. Another polyimide film was produced by further heating this polyimide film for another 10 minutes at 350° C. The properties of the resultant polyimide films are shown in Table 1.

Comparative Example 1

A polyimide precursor solution composition was prepared in the same way as in Example 1, except that 1.10 g (0.003 mol) of 3,3',4,4'-biphenyltetracarboxylic acid (also abbreviated hereinafter as "s-BPTA") was added instead, without adding mellitic acid. The ratio of carboxylic acid groups in the BPTA to the amine component was the same as the ratio of carboxylic acid groups in the mellitic acid to the amine component of Example 1.

Using this polyimide precursor solution composition, polyimide films were produced in the same way as in Example 1. The properties of the resultant polyimide films are shown in Table 1.

The polyimide obtained in Comparative Example 1 is a straight-chain polyimide obtained by making substantially equimolar the amount of the tetracarboxylic acid component and the amount of the diamine component of the polyamic acid (A) used in Example 1.

The properties of the polyimide films of Example 1 were better compared to Comparative Example 1, particularly when the heating temperature was low, and were the same as or better than Comparative Example 1 even when the film was heated at 350° C.

TABLE 1

| | Final Heating Temperature (° C.) | Tensile Properties | | | |
|---|---|---|---|---|---|
| | | Elastic modulus (GPa) | Strength at yield point (MPa) | Elongation at break (%) | Strength at break (MPa) |
| Example 1 | 250 | 3.48 | 123 | 63 | 219 |
| | 350 | 3.48 | 130 | 58 | 210 |
| Comparative Example 1 | 250 | 2.31 | 91 | 80 | 152 |
| | 350 | 3.41 | 120 | 78 | 193 |

Example 2

To 221 g of NMP was dissolved 20.02 g (0.100 mol) of ODA. To this solution was added 28.54 g (0.097 mol) of s-BPDA, and the mixture was stirred for 24 hours at 25° C. until the s-BPDA dissolved and the solution became viscous, to obtain a solution of polyamic acid (A). The concentration of the polyamic acid in the solution was 18% by mass and the solution viscosity was 58 poise. To this solution were added, and dissolved evenly, 0.17 g (0.0005 mol; 0.005 times by mole the number of moles of ODA) of mellitic acid (which is 0.08 times by mole with respect to 0.006 mol which is the number of end amino groups of the polyamic acid if theoretical reaction occurs between ODA and s-BPDA) and 0.82 g (0.00225 mol; 0.0225 times by mole the number of moles of ODA) of s-BPTA, to prepare a polyimide precursor solution composition. The solution viscosity of the prepared polyimide precursor solution composition was 58 poise, which hardly changed after storage for 3 days at room temperature.

The prepared polyimide precursor solution composition was casted onto a glass plate serving as a base material and dried with hot air for 30 minutes at 120° C. The dried film was peeled off from the glass plate, fixed in a metal frame, and heated for 10 minutes at 250° C., to produce a 40-μm-thick polyimide film. Another polyimide film was produced by further heating this polyimide film for another 10 minutes at 350° C. The properties of the resultant polyimide films are shown in Table 2.

Example 3

A polyimide precursor solution composition was prepared in the same way as in Example 2, except that the amounts of mellitic acid and s-BPTA were changed to 0.34 g (0.001 mol) and 0.54 g (0.0015 mol), respectively. The solution viscosity of the prepared polyimide precursor solution composition was 58 poise, which hardly changed after storage for 3 days at room temperature.

The prepared polyimide precursor solution composition was casted onto a glass plate serving as a base material and dried with hot air for 30 minutes at 120° C. The dried film was peeled off from the glass plate, fixed in a metal frame, and heated for 10 minutes at 250° C. and for another 10 minutes at 300° C., to produce a 39-μm-thick polyimide film. Another polyimide film was produced by instead heating the dried film for 10 minutes at 250° C. and then for another 10 minutes at 350° C. The properties of the resultant polyimide films are shown in Table 2.

Comparative Example 2

A polyimide precursor solution composition was prepared in the same way as in Example 2, except that 1.10 g (0.003 mol) of s-BPTA was added without adding mellitic acid.

The amount of carboxyl groups in the s-BPTA added herein is substantially the same as the total amount of the carboxyl groups in the mellitic acid and the carboxyl groups in the s-BPTA of Example 2 or 3.

The prepared polyimide precursor solution composition was casted onto a glass plate serving as a base material and dried with hot air for 30 minutes at 120° C. The dried film was peeled off from the glass plate, fixed in a metal frame, and heated for 10 minutes at 250° C., to produce a 40-μm-thick polyimide film. Another polyimide film was produced by further heating this polyimide film for another 10 minutes at 300° C. Another polyimide film was produced by instead heating the dried film for 10 minutes at 250° C. and then for another 10 minutes at 350° C. The properties of the resultant polyimide films are shown in Table 2.

The polyimide obtained in Comparative Example 2 is a straight-chain polyimide obtained by making substantially equivalent the amount of the tetracarboxylic acid component and the amount of the diamine component of the polyamic acid (A) used in Example 2 or 3.

The properties of the polyimide films of Examples 2 and 3 were better compared to Comparative Example 2, particularly when the heating temperature was low, and were the same as or better than Comparative Example 2 even when the film was heated at 350° C.

Example 4

To 179 g of NMP was dissolved 10.81 g (0.100 mol) of p-phenylenediamine (also abbreviated hereinafter as "PPD"). To this solution was added 28.54 g (0.097 mol) of s-BPDA, and the mixture was stirred for 24 hours at 25° C. until the s-BPDA dissolved and the solution became viscous, to obtain a solution of polyamic acid (A). The concentration of the polyamic acid in the solution was 18% by mass and the solution viscosity was 89 poise. To this solution were added 0.17 g (0.0005 mol; 0.005 times by mole the number of moles of PPD) of mellitic acid (which is 0.08 times by mole with respect to 0.006 mol which is the number of end amino groups of the polyamic acid if theoretical reaction occurs between PPD and s-BPDA) and 0.82 g (0.00225 mol; 0.0225 times by mole the number of moles of PPD) of s-BPTA, to prepare a polyimide precursor solution composition. The solution viscosity of the prepared polyimide precursor solution composition was 89 poise, which hardly changed after storage for 3 days at room temperature.

The prepared polyimide precursor solution composition was casted onto a glass plate serving as a base material and dried with hot air for 30 minutes at 120° C. The dried film was peeled off from the glass plate, fixed in a metal frame, and heated for 10 minutes at 250° C., to produce a 38-μm-thick polyimide film. Another polyimide film was produced by further heating this polyimide film for another 10 minutes at 350° C. The properties of the resultant polyimide films are shown in Table 2.

Comparative Example 3

A polyimide precursor solution composition was prepared in the same way as in Example 4, except that 1.100 g (0.003 mol) of s-BPTA was added without adding mellitic acid.

The amount of carboxyl groups in the s-BPTA added herein is substantially the same as the total amount of the carboxyl groups in the mellitic acid and the carboxyl groups in the s-BPTA of Example 4.

As in Example 4, the prepared polyimide precursor solution composition was casted onto a glass plate serving as a base material and dried with hot air for 30 minutes at 120° C. The dried film was peeled off from the glass plate, fixed in a metal frame, and heated for 10 minutes at 250° C., to produce a 40-μm-thick polyimide film. Another polyimide film was produced by further heating this polyimide film for another 10 minutes at 300° C. Another polyimide film was produced by further heating this polyimide film for another 10 minutes at 350° C. The properties of the resultant polyimide films are shown in Table 2.

The polyimide obtained in Comparative Example 3 is a straight-chain polyimide obtained by making substantially equivalent the amount of the tetracarboxylic acid component and the amount of the diamine component of the polyamic acid (A) used in Example 4.

The properties of the polyimide films of Example 4 were better compared to Comparative Example 3, particularly when the heating temperature was low, and were the same as or better than Comparative Example 3 even when the film was heated at 350° C.

Example 5

To 187 g of NMP was dissolved 20.02 g (0.100 mol) of ODA. To this solution was added 21.16 g (0.097 mol) of pyromellitic dianhydride (also abbreviated hereinafter as "PMDA"), and the mixture was stirred at 25° C. until the PMDA dissolved and the solution became viscous, to obtain a solution of polyamic acid (A). The concentration of the solution was 18 wt % and the solution viscosity was 20 poise. To this solution were added 0.17 g (0.0005 mol; 0.005 times by mole the number of moles of ODA) of mellitic acid (which is 0.08 times by mole with respect to 0.006 mol which is the number of end amino groups of the polyamic acid if theoretical reaction occurs between ODA and PMDA) and 0.57 g (0.00225 mol) of pyromellitic acid (also abbreviated hereinafter as "PMTA"), to prepare a polyimide precursor solution composition. The solution viscosity of the prepared polyimide precursor solution composition was 20 poise, which hardly changed after storage for 3 days at room temperature.

The prepared polyimide precursor solution composition was casted onto a glass plate and dried with hot air for 30 minutes at 120° C. The dried film was peeled off from the glass plate, fixed in a metal frame, and heated for 10 minutes at 250° C., to produce a 40-μm-thick polyimide film. Another polyimide film was produced by further heating this polyimide film for another 10 minutes at 350° C. The properties of the resultant polyimide films are shown in Table 2.

Comparative Example 4

A polyimide precursor solution composition was prepared in the same way as in Example 5, except that 0.76 g (0.003 mol) of PMTA was added without adding mellitic acid.

The concentration of carboxyl groups in the PMTA added herein is substantially the same concentration as the total amount of the carboxyl groups in the mellitic acid and the carboxyl groups in the PMTA of Example 5.

The prepared polyimide precursor solution composition was made into polyimide films in the same way as in Example 5. The properties of the resultant polyimide films are shown in Table 2.

The polyimide obtained in Comparative Example 4 is a straight-chain polyimide obtained by making substantially equivalent the amount of the tetracarboxylic acid component and the amount of the diamine component of the polyamic acid (A) used in Example 5.

The properties of the polyimide films of Example 5 were better compared to Comparative Example 4, particularly when the heating temperature was low, and were the same as or better than Comparative Example 4 even when the film was heated at 350° C.

Example 6

To 307 g of NMP was dissolved 41.05 g (0.100 mol) of 2,2-bis[4-(4-aminophenoxy)phenyl]propane (also abbreviated hereinafter as "BAPP"). To this solution was added 31.26 g (0.097 mol) of benzophenone tetracarboxylic dianhydride (also abbreviated hereinafter as "BTDA"), and the mixture was stirred at 25° C. until the BTDA dissolved and the solution became viscous, to obtain a solution of polyamic acid (A). The concentration of the solution was 19 wt % and the solution viscosity was 18 poise. To this solution were added 0.17 g (0.0005 mol; 0.005 times by mole the number of moles of BAPP) of mellitic acid (which is 0.08 times by mole with respect to 0.006 mol which is the number of end amino groups of the polyamic acid if theoretical reaction occurs between BAPP and BTDA) and 0.82 g (0.00225 mol) of s-BPTA, to prepare a polyamic acid solution composition. The solution viscosity of the prepared polyamide solution composition was 18 poise, which hardly changed after storage for 3 days at room temperature.

The prepared polyamic acid solution composition was casted onto a glass plate and dried with hot air for 30 minutes at 120° C. The dried film was peeled off from the glass plate, fixed in a metal frame, and heated for 10 minutes at 180° C., to produce a 42-μm-thick polyimide film. The properties of the resultant polyimide film are shown in Table 2.

Comparative Example 5

A polyimide precursor solution composition was prepared in the same way as in Example 6, except that 1.10 g (0.003 mol) of s-BPTA was added without adding mellitic acid.

The prepared polyimide precursor solution composition was made into a polyimide film in the same way as in Example 6. The properties of the resultant polyimide film are shown in Table 2.

The polyimide of Comparative Example 5 is almost the same as a straight-chain polyimide obtained by making substantially equivalent the amount of the tetracarboxylic acid component and the amount of the diamine component of the polyamic acid (A) used in Example 6.

The properties of the polyimide film of Example 6 were better than those of Comparative Example 5.

Example 7

To check the reproducibility of Example 2, a polyamic acid (A) and a polyimide precursor solution composition were prepared in the same way as in Example 2, and the prepared polyimide precursor solution composition was used for film formation and heating, to produce a 41-μm-thick polyimide film. The properties of the resultant polyimide films are shown in Table 2.

The polyimide films had substantially the same properties as those of Example 2, thus exhibiting good reproducibility.

Comparative Example 6

A polyimide precursor solution was prepared in the same way as in Example 2, except that 0.68 g (0.002 mol) of mellitic acid was added without adding s-BPTA.

The amount of carboxyl groups in the mellitic acid added herein is substantially the same as the total amount of the carboxyl groups in the mellitic acid and the carboxyl groups in the s-BPTA of Example 2.

The prepared polyimide precursor solution composition was casted onto a glass plate serving as a base material and dried with hot air for 30 minutes at 120° C. The dried film was peeled off from the glass plate, fixed in a metal frame, and heated for 10 minutes at 250° C., then for another 10 minutes at 350° C., to produce a 40-μm-thick polyimide film. The properties of the resultant polyimide film are shown in Table 2.

Comparative Example 7

To check the reproducibility of Comparative Example 6, a polyimide precursor solution was prepared in the same way as in Comparative Example 6, and the prepared polyimide precursor solution composition was used to produce a polyimide film. The properties of the resultant polyimide film are shown in Table 2.

Both Comparative Examples 6 and 7 had small elongation at break, thus being more brittle than Comparative Example 2 which was a polyimide film made of a straight-chain polyimide obtained by making substantially equivalent the amount of the tetracarboxylic acid component and the amount of the diamine component of the polyamic acid (A) used in Example 2 or 3. Further, Comparative Examples 6 and 7 were checked for reproducibility by using the same conditions, but there were significant variations in the properties (elongation at break) of the resultant polyimide films.

Reference Example 1

To 259 g of NMP was dissolved 20.02 g (0.100 mol) of ODA. To this solution was added 29.20 g (0.099 mol) of s-BPDA, and the mixture was stirred for 24 hours at 25° C. until the s-BPDA dissolved and the solution became viscous, to obtain a polyamic acid solution. The concentration of the polyamic acid in the solution was as low as 16% by mass, but the solution viscosity was as high as 650 poise.

The prepared polyamic acid solution was casted onto a glass plate serving as a base material and dried with hot air for 30 minutes at 120° C. The dried film was peeled off from the glass plate, fixed in a metal frame, and heated for 10 minutes at 250° C., then for another 10 minutes at 350° C., to produce a 42-μm-thick polyimide film. The properties of the resultant polyimide film are shown in Table 2.

TABLE 2

| | Maximum Heating Temperature (° C.) | Tensile Properties | | |
| --- | --- | --- | --- | --- |
| | | Elastic modulus (GPa) | Elongation at break (%) | Strength at break (MPa) |
| Example 2 | 250 | 3.18 | 70 | 205 |
| | 350 | 3.38 | 84 | 233 |
| Example 3 | 300 | 3.72 | 87 | 258 |
| | 350 | 3.52 | 72 | 248 |
| Comparative Example 2 | 250 | 2.31 | 80 | 152 |
| | 300 | 3.22 | 84 | 216 |
| | 350 | 3.41 | 78 | 193 |
| Example 4 | 250 | 8.14 | 18 | 259 |
| | 350 | 8.10 | 20 | 299 |
| Comparative Example 3 | 250 | 7.76 | 15 | 211 |
| | 350 | 8.37 | 18 | 273 |
| Example 5 | 250 | 2.62 | 84 | 198 |
| | 350 | 2.19 | 100 | 240 |
| Comparative Example 4 | 250 | 2.48 | 74 | 158 |
| | 350 | 2.38 | 97 | 218 |
| Example 6 | 180 | 3.20 | 84 | 138 |
| Comparative Example 5 | 180 | 2.80 | 84 | 109 |
| Example 7 | 250 | 3.10 | 76 | 212 |
| | 350 | 3.46 | 80 | 229 |
| Comparative Example 6 | 350 | 3.48 | 58 | 210 |
| Comparative Example 7 | 350 | 3.82 | 30 | 218 |
| Reference Example 1 | 350 | 3.49 | 70 | 220 |

Example 8

To 182 g of N-methyl-2-pyrrolidone were dissolved 9.01 g (0.045 mol) of ODA and 8.77 g (0.03 mol) of 1,3-bis(4-aminophenoxy)benzene (also abbreviated hereinafter as "TPE-R"). To this solution was placed 21.4 g (0.073 mol) of s-BPDA, and the mixture was stirred for 24 hours at 25° C. in a nitrogen atmosphere, to prepare a solution of polyamic acid (A). The molar ratio between ODA and TPE-R of the polyamic acid (ODA:TPE-R) was 6:4, and the molar ratio between the tetracarboxylic acid component and the diamine component (tetracarboxylic acid component/diamine component) was 0.97. To this solution were added 0.56 g (1.68 mmol) of s-BPTA and 0.13 g (0.38 mmol) of mellitic acid, and the mixture was stirred for 3 hours at 25° C., to prepare a polyimide precursor solution composition. The solution had a concentration of 18 wt % and a viscosity of 42 poise. The solution composition was stably storable for 2 weeks at room temperature in a cool dark place.

The prepared polyimide precursor solution composition was casted onto a glass plate, heated and dried for 50 minutes at 120° C., and peeled off from the glass plate. The peeled-off film was fixed in a metal frame, and heated for 10 minutes at 250° C., for 5 minutes at 300° C., then for 10 minutes at 350° C., to produce a 25-μm-thick polyimide film. The properties of the resultant film are shown in Table 3. The film did not melt even when heated at 450° C.

Further, 4.77 g of the prepared polyimide precursor solution composition (the weight of solids content after imidization: 0.8 g) and 9.3 g of 300-mesh silicon powder were kneaded and ground in a mortar, to prepare a mixture paste for an electrode. The prepared paste was thinly spreadable on a copper foil using a glass rod. The copper foil coated with the paste was fixed on a substrate and was heated in a nitrogen atmosphere for 1 hour at 120° C., for 10 minutes at 200° C., for 10 minutes at 220° C., for 10 minutes at 250° C., for 10 minutes at 300° C., and then for 10 minutes at 350° C., which allowed production of an electrode with a 98-μm-thick active-material layer.

Example 9

To 128 g of NMP were dissolved 3 g (0.015 mol) of ODA and 10.23 g (0.035 mol) of TPE-R. To this solution was placed 14.27 g (0.0485 mol) of s-BPDA, and the mixture was stirred for 24 hours at 25° C. in a nitrogen atmosphere, to prepare a solution of polyamic acid (A). The molar ratio between ODA and TPE-R of the polyamic acid (ODA:TPE-R) was 3:7, and the molar ratio between the tetracarboxylic acid component and the diamine component (tetracarboxylic acid component/diamine component) was 0.97. To this solution were added 0.37 g (1.13 mmol) of s-BPTA and 0.09 g (0.25 mmol) of mellitic acid, and the mixture was stirred for 3 hours at 25° C., to prepare a polyimide precursor solution composition. The solution had a concentration of 18 wt % and a viscosity of 33 poise. The solution composition was stably storable for 2 weeks at room temperature in a cool dark place.

The prepared polyimide precursor solution composition was processed in the same way as in Example 8, to produce a 26-μm-thick polyimide film. The properties of the resultant film are shown in Table 3.

Example 10

A polyimide precursor solution composition was prepared in the same way as in Example 9, except that 8.01 g (0.04 mol) of ODA and 2.92 g (0.01 mol) of TPE-R were used to make the molar ratio between ODA and TPE-R (ODA:TPE-R) of the polyamic acid 8:2, and that 117 g of NMP was used. The solution had a concentration of 18 wt % and a viscosity of 56 poise. The solution composition was stably storable for 2 weeks at room temperature in a cool dark place.

The prepared polyimide precursor solution composition was processed in the same way as in Example 8, to produce a 25-μm-thick polyimide film. The properties of the resultant film are shown in Table 3.

Comparative Example 8

A polyimide precursor solution composition was prepared in the same way as in Example 8, except that 0.74 g (2.25 mmol) of s-BPTA was added instead of adding mellitic acid, and a polyimide film was produced according to the above-described process. The properties of the resultant film are shown in Table 3.

Comparative Examples 9 and 10

Respective polyimide precursor solution compositions were prepared in the same way as in Examples 9 and 10, except that 0.495 g (1.5 mmol) of s-BPTA was added instead of adding mellitic acid, and respective polyimide films were produced according to the above-described process. The properties of the resultant films are shown in Table 3.

Comparative Example 11

A polyimide precursor solution composition was prepared in the same way as in Example 9, except that 14.62 g (0.05 mol) of TPE-R was used instead of using ODA and that 134 g of NMP was used. The solution had a concentration of 18 wt % and a viscosity of 48 poise. Further, the prepared polyimide precursor solution composition was processed in the same way as in Example 8, to produce a 28-μm-thick polyimide film. The properties of the resultant film are shown in Table 3.

Comparative Example 12

A polyimide precursor solution composition was prepared in the same way as in Example 9, except that 9.01 g (0.045 mol) of ODA and 1.46 g (0.005 mol) of TPE-R were used to make the molar ratio between ODA and TPE-R (ODA:TPE-R) of the polyamic acid 9:1, and that 115 g of NMP was used. The solution had a concentration of 18 wt % and a viscosity of 55 poise. Further, the prepared polyimide precursor solution composition was processed in the same way as in Example 8, to produce a 25-μm-thick polyimide film. The properties of the resultant film are shown in Table 3.

TABLE 3

| | | | | Example 8 | Example 9 | Example 10 | Comp. Example 8 | Comp. Example 9 | Comp. Example 10 | Comp. Example 11 | Comp. Example 12 |
|---|---|---|---|---|---|---|---|---|---|---|---|
| Solution Composition[*1] | Polyamic Acid | s-BPDA | (mol) | 0.073 | 0.0485 | 0.0485 | 0.073 | 0.0485 | 0.0485 | 0.0485 | 0.0485 |
| | | TPE-R | (mol) | 0.03 | 0.035 | 0.01 | 0.03 | 0.035 | 0.01 | 0.05 | 0.005 |
| | | ODA | (mol) | 0.045 | 0.015 | 0.04 | 0.045 | 0.015 | 0.04 | — | 0.0045 |
| | | Acid/Amine | (molar ratio) | 0.97 | 0.97 | 0.97 | 0.97 | 0.97 | 0.97 | 0.97 | 0.97 |
| | | Composition[*2] | | 6:4 | 3:7 | 8:2 | 6:4 | 3:7 | 8:2 | 0:10 | 9:1 |
| | | Solvent | | NMP | NMP | NMP | NMP | NMP | NMP | NMP | NMP |
| | | s-BPTA | (mol) | 0.00168 | 0.00113 | 0.00113 | 0.00225 | 0.0015 | 0.0015 | 0.00113 | 0.00113 |
| | | MA | (mol) | 0.00038 | 0.00025 | 0.00025 | — | — | — | 0.00025 | 0.00025 |
| | | Conc. | (wt %) | 18 | 18 | 18 | 18 | 18 | 18 | 18 | 18 |
| Properties | | Degree of swelling | (wt %) | 0 | 2 | 0 | 0 | 1 | 0 | 2 | 1 |
| | | Elongation at break | (%) | 213 | 168 | 140 | 182 | 145 | 134 | 127 | 98 |
| | | Strength at break | (MPa) | 160 | 169 | 231 | 145 | 162 | 214 | 116 | 189 |
| | | Energy at break | (J/cm$^3$) | 247 | 207 | 229 | 204 | 178 | 203 | 135 | 131 |
| | | Elastic modulus | (GPa) | 3.3 | 3.3 | 3.4 | 3.5 | 3.6 | 3.7 | 3.4 | 3.6 |

[*1] s-BPDA: 3,3',4,4'-biphenyltetracarboxylic dianhydride; TPE-R: 1,3-bis(4-aminophenoxy)benzene; ODA: 4,4'-oxydianiline; s-BPTA: 3,3',4,4'-biphenyltetracarboxylic acid; NMP: N-methyl-2-pyrrolidone; BTDA: benzophenone tetracarboxylic dianhydride; BAPP: 2,2-bis[4-(4-aminophenoxy)phenyl]propane; MA: mellitic acid
[*2] "Composition" means "molar ratio of ODA:TPE-R"

INDUSTRIAL APPLICABILITY

The present invention can provide polyimide precursor solution compositions whose solution viscosity can easily be adjusted, that have stable solution viscosity, and that can suitably produce polyimide-resin-formed products, such as polyimide films, having properties equal to or superior to those of straight-chain polyimides through heating at relatively low temperatures and/or in a short time.

Further, polyimide-formed products having excellent toughness and electrodes for electrochemical elements having excellent properties can be produced using the present invention.

The invention claimed is:

1. A polyimide precursor solution composition, consisting of:
   (A) a polyamic acid;
   (B) a carboxylic acid compound having at least three pairs of carboxyl groups within its molecule or an esterified product thereof; and
   (D) a solvent,
   wherein said carboxylic acid compound (B) is a mellitic acid compound represented by chemical formula (1):

Chemical Formula (1)

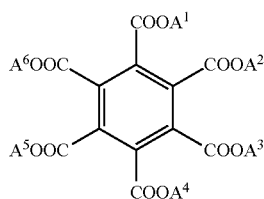

wherein $A^1$ to $A^6$ each independently represent a monovalent group selected from a hydrogen atom, an aliphatic group, or an aromatic group.

2. The composition according to claim 1, wherein the number of moles of the mellitic acid compound is 0.001 to 0.05 times the number of moles of a diamine component constituting the polyamic acid (A).

3. The composition according to claim 1, wherein a molar ratio between a diamine component and a tetracarboxylic acid component constituting the polyamic acid (A), defined as the number of moles of the diamine component/the number of moles of the tetracarboxylic acid component, is from 0.98 to 1.05.

4. The composition according to claim 1, wherein the polyamic acid (A) contains a repeating unit represented by chemical formula (3):

Chemical Formula (3)

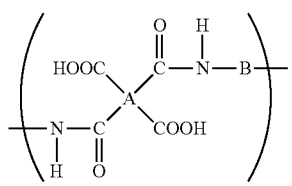

wherein A is a group selected from tetravalent groups obtained by removing carboxyl groups from the tetracarboxylic acids represented by chemical formula (4); and B is a group selected from divalent groups obtained by removing amino groups from the diamines represented by chemical formula (5):

Chemical Formula (4)

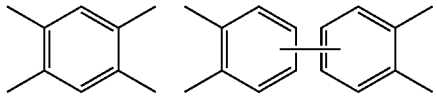

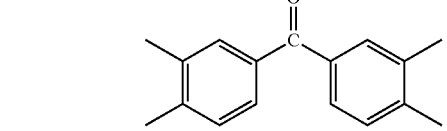

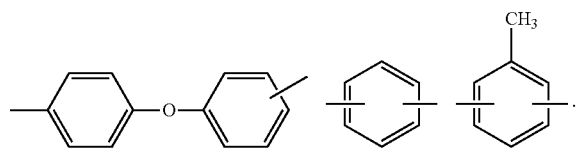

Chemical Formula (5)

5. The composition according to claim 1, wherein the concentration of (A) polyamic acid is 5% to 35% by mass.

6. A polyimide precursor solution composition, consisting of:
   (A) a polyamic acid;
   (B) a carboxylic acid compound having at least three pairs of carboxyl groups within its molecule or an esterified product thereof;
   (C) a carboxylic acid compound having two pairs of carboxyl groups within its molecule or an esterified product thereof; and
   (D) a solvent,
   wherein said carboxylic acid compound (B) is a mellitic acid compound represented by chemical formula (1):

Chemical Formula (1)

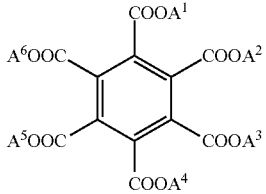

wherein $A^1$ to $A^6$ each independently represent a monovalent group selected from a hydrogen atom, an aliphatic group, or an aromatic group.

7. The composition according to claim 6, wherein a total of the number of moles of the carboxylic acid compound (B) or esterified product thereof and the number of moles of the carboxylic acid compound (C) or esterified product thereof is 0.001 to 0.05 times the number of moles of a diamine component constituting the polyamic acid (A).

8. The composition according to claim 6, wherein the number of moles of the carboxylic acid compound (B) or esterified product thereof is 0.0005 to 0.02 times the number of moles of a diamine component constituting the polyamic acid (A).

* * * * *